United States Patent [19]
Akazawa et al.

[11] 4,163,989
[45] Aug. 7, 1979

[54] DETECTOR CIRCUIT FOR COLOR TELEVISION RECEIVERS

[75] Inventors: Susumu Akazawa, Ichikawa; Kyoichi Murakami, Chigasaki; Kiyoshi Ishihata, Fujisawa; Takao Tsuchiya, Kanagawa, all of Japan

[73] Assignee: Sony Corporation, Tokyo, Japan

[21] Appl. No.: 903,003

[22] Filed: May 4, 1978

[30] Foreign Application Priority Data

May 17, 1977 [JP] Japan .............................. 52-63109[U]

[51] Int. Cl.² ..................... H04N 9/535; H03D 1/02
[52] U.S. Cl. ...................................... 358/27; 328/26; 307/261
[58] Field of Search .................... 358/26, 27, 23, 175; 328/26; 307/261; 329/166; 325/400, 402, 403, 478

[56] References Cited
U.S. PATENT DOCUMENTS

| | | | |
|---|---|---|---|
| 3,860,954 | 1/1975 | Tsuchiya | 358/25 |
| 3,970,870 | 7/1976 | Horichi | 307/261 |
| 4,051,386 | 9/1977 | Long et al. | 307/261 |

Primary Examiner—John C. Martin
Attorney, Agent, or Firm—Lewis H. Eslinger; Alvin Sinderbrand

[57] ABSTRACT

A detector circuit for a color television receiver includes a pair of transistors whose collector-emitter circuits are connected in parallel with each other, an input circuit, such as a differential amplifier, for supplying a differential input signal to the base electrodes of the pair of transistors, an impedance element coupled between the collector electrodes of the pair of transistors and a voltage source, and an integration circuit for integrating a detected signal taken from the collector electrodes of the pair of transistors and thereby providing an output signal. A reference-voltage circuit is included to supply a reference voltage, which can be used as a threshold voltage, to the emitter electrodes of the pair of transistors. The detector circuit is advantageously used in the color demodulating circuit of a color television receiver, wherein an oscillator controlled by color burst signals supplies the input signal to the detector circuit, and the output thereof is used to control the gain of an ACC amplifier.

6 Claims, 5 Drawing Figures

DETECTOR CIRCUIT FOR COLOR TELEVISION RECEIVERS

BACKGROUND OF THE INVENTION

1. Field of the Invention

This invention relates generally to a detector circuit suitable for use with a color television receiver, and is directed more particularly to an ACC detector circuit which detects the amplitude of a color burst signal and produces a control signal for the ACC amplifier.

2. Description of the Prior Art

In the art there has been proposed such a detector circuit which directly detects the peak value of the burst signal from a burst gate circuit and then produces a control signal for an ACC amplifier to control the latter. When the above prior art detector circuit is used for receiving a black and white television broadcasting signal or when the signal provided thereto is feeble, the detector circuit can not produce a detected signal with high fidelity due to the influence of noise, and the color killer becomes unstable in operation.

Further, the period in which the burst signal exists is short as compared with the period between successive burst signals and hence the detected output is small, so that a sufficient ACC gain can not be obtained.

OBJECTS AND SUMMARY OF THE INVENTION

Accordingly, it is an object of the present invention to provide a novel detector circuit free from the defects of the prior art detector circuit.

It is another object of the invention to provide an improved detector circuit.

It is a further object of the invention to provide an AM full-wave detector circuit of a simple circuit construction which is suitable for use in an ACC circuit of a color television receiver to be made as an integrated circuit.

It is a further object of the invention to provide an ACC circuit system in which the detector circuit of the invention is used.

According to an aspect of the present invention, a detector circuit, which can be used to control the gain of an ACC amplifier, includes a pair of transistors each having two current-carrying electrodes, such as a collector and an emitter, and a control electrode, such as a base, the pair of transistors being arranged so that circuits defined by the current-carrying electrodes of each of the transistors are connected in parallel with each other; circuit means, such as differential amplifier, for supplying a differential input signal to the control electrodes of the pair of transistors; a reference voltage source supplying a reference voltage to one set of current-carrying electrodes, such as the emitters, of the pair of transistors; a supply terminal for receiving a supply voltage; an impedance element coupled between the other set of current-carrying electrodes, such as the collectors, of the pair of transistors and the supply terminal; and an integration circuit for integrating a detected signal taken from the latter current-carrying electrodes and providing an output signal. In one arrangement, the reference voltage source includes another transistor with collector, emitter, and base electrode, an impedance connected between the latter current-carrying electrodes of the pair of transistors and a reference point, a circuit for supplying current from the supply terminal to the collector of the other transistor, the emitter thereof being connected to the latter current-carrying electrodes, and a biasing circuit to bias the base of the other transistors so that the reference potential is applied at the emitter thereof.

This detector circuit is desirably included in the color demodulation circuit of a color television receiver. In such a demodulation circuit an ACC amplifier supplies a chrominance signal as an output thereof. Means are included to apply the chrominance signal from the ACC amplifier to a color demodulator, and there are also provided means, including an oscillator, to provide a demodulating signal to the demodulator in response to the output of the ACC amplifier. The oscillator is also used to provide the input signal to the detector circuit, and the output of the latter is, in turn, used to control the gain of the ACC amplifier.

As the detector circuit provides an output corresponding to that part of the input signal that exceeds the reference voltage, the detector circuit will provide a signal to the ACC amplifier only when a substantially steady signal, such as that supplied by the oscillator in response to a color burst signal, is provided as an input signal. The detector circuit then responds to variations in that steady signal to provide a control signal to the ACC amplifier. The emitter electrodes of the transistors which are connected together are supplied with a reference voltage through another transistor. The parts of the signals applied to the base electrodes of the transistors which exceed the reference voltage are full-wave-rectified and the detected output is delivered to the collector electrodes of the transistors which are connected commonly. The detected output from the collector electrodes is fed back to the ACC amplifier to carry out the ACC operation so as to keep the amplitude of the burst signal substantially constant.

According to an example of the present invention there is provided detector circuit for color television receiver which comprises a pair of transistors having collector and emitter electrodes coupled in parallel with each other and base electrodes, respectively, a circuit for supplying a differential input signal to each of the base electrodes of said pair of transistors, a reference voltage source coupled to the emitter electrodes of said pair of transistors, an impedance element coupled between the collector electrodes of said pair of transistors and a voltage source, and an integrating circuit for integrating a detected signal from the collector electrodes of said pair of transistors.

The other objects, features and advantages of the present invention will become apparent from the following description taken in conjunction with the accompanying drawings.

DESCRIPTION OF THE PREFERRED EMBODIMENT

Figure 1:
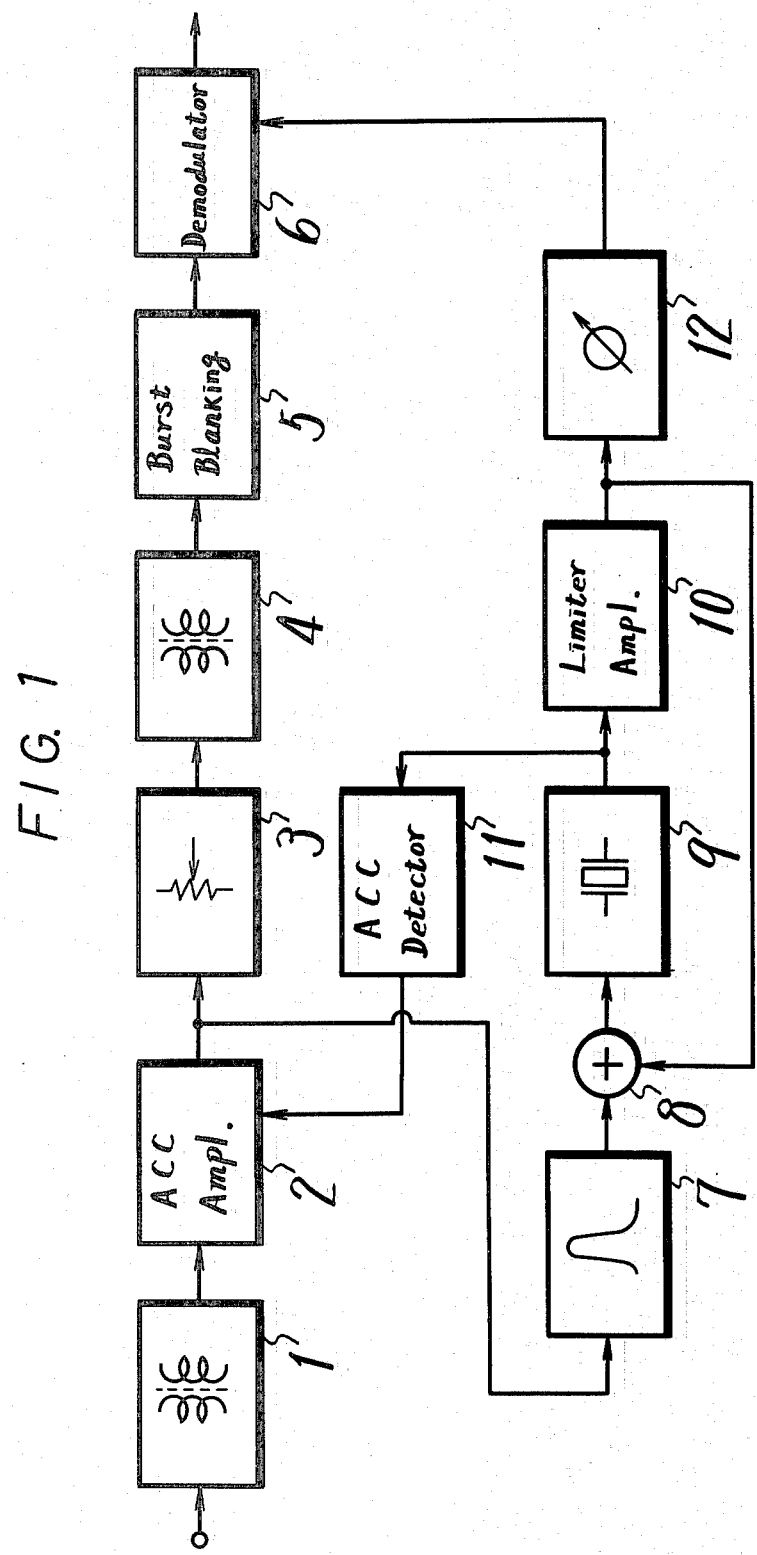
FIG. 1 is a systematic block diagram showing an example of a color demodulating circuit in which the detector circuit of the present invention can be used to advantage.

A color demodulating circuit for use in a color television receiver, to which the present invention can be applied, will be firstly described with reference to FIG. 1. In the color demodulating circuit shown in FIG. 1, a video signal from a video amplifier (not shown) is fed through an input terminal to a band pass transformer 1 which then passes a color sub-carrier signal. This color sub-carrier signal is applied enccessively through an ACC (automatic chrominance control) amplifier 2, a color level controller circuit 3, a band pass transformer 4 and a color or burst blanking circuit 5 which will remove a burst signal in this order to a demodulator circuit 6.

The color sub-carrier signal from the ACC amplifier 2 is also fed to a burst gate circuit 7 which extracts a burst signal and applies this burst signal through an adder circuit 8 to a crystal filter 9. This crystal filter 9 produces a continuous wave signal which is then applied to a limiter amplifier 10 to assure that the continuous wave signal has a constant amplitude. The continuous wave signal with the constant amplitude from the limiter amplifier 10 is fed back to the adder circuit 8 to be added to the burst signal from the burst gate circuit 7. Thus, the positive feedback loop from the adder circuit 8 through the crystal filter 9 and limiter amplifier 10 back to the adder circuit 8 forms a reference oscillator of the injection lock type. When the burst signal from the burst gate circuit 7 is injected to the reference oscillator, the phase of the continuous wave signal from the crystal filter 9 and accordingly from the limiter amplifier 10 is controlled in accordance with the phase of the burst signal. That is, the limiter amplifier 10 develops the continuous wave signal which has the same phase as that of the burst signal and has a constant amplitude.

The output signal from the adder circuit 8 is a signal which consists of the continuous wave signal with constant amplitude from the limiter amplifier 10 and the burst signal from the burst gate circuit 7 added to the formers, so that the amplitude of the continuous wave signal from the crystal filter 9 corresponds to that of the burst signal. The continuous wave signal from the crystal filter 9 is also fed to an ACC detector circuit 11 which detects the amplitude of the continuous wave signal and hence detects the amplitude of the burst signal. The output signal from the ACC detector circuit 11 is applied to the ACC amplifier 2 to control the latter such that the ACC amplifier 2 produces a color sub-carrier signal having a constant level. The output signal from the crystal filter 9 i.e., the continuous wave signal with the same phase as that of the burst signal and constant amplitude, provided from the limiter amplifier 10, is applied to a phase shifter 12 which then produces demodulating signals with the R-Y and B-Y axes, or with the G-Y axis. The demodulating signal from the phase shifter 12 is applied to the demodulator circuit 6, and hence the demodulator circuit 6 produces demodulated output signals of the respective color difference signals.

According to the color demodulating circuit shown in FIG. 1, the reference oscillator of the injection lock type is formed by the feedback loop consisting of the adder circuit 8, the crystal filter 9 and limiter amplifier 10 and the burst signal from the burst gate circuit 7 is added to the continuous wave signal with the constant amplitude from the limiter amplifier 10 in the adder circuit 8. Thus, this color demodulating circuit of FIG. 1 is simplified in construction as compared with another demodulating circuit in which the burst signal is fed to a crystal filter, the output signal from the crystal filter is amplified by an amplifier of high gain and the output signal from the high gain amplifier is fed to a controlled oscillator.

Further, in the circuit of FIG. 1, the signal consisting of the continuous wave signal with constant amplitude from the limiter amplifier 10 and the burst signal added thereto is fed to the crystal filter 9 and the output signal from the latter is detected to carry out the ACC operation, so that the ACC operation becomes stable. Also, the circuit shown in FIG. 1 is suitable to be made as an integrated circuit.

An example of the detector circuit according to the present invention, which is preferable as the ACC detector circuit 11 of the color demodulating circuit shown in FIG. 1, will be described with reference to FIG. 2.

Figure 2:
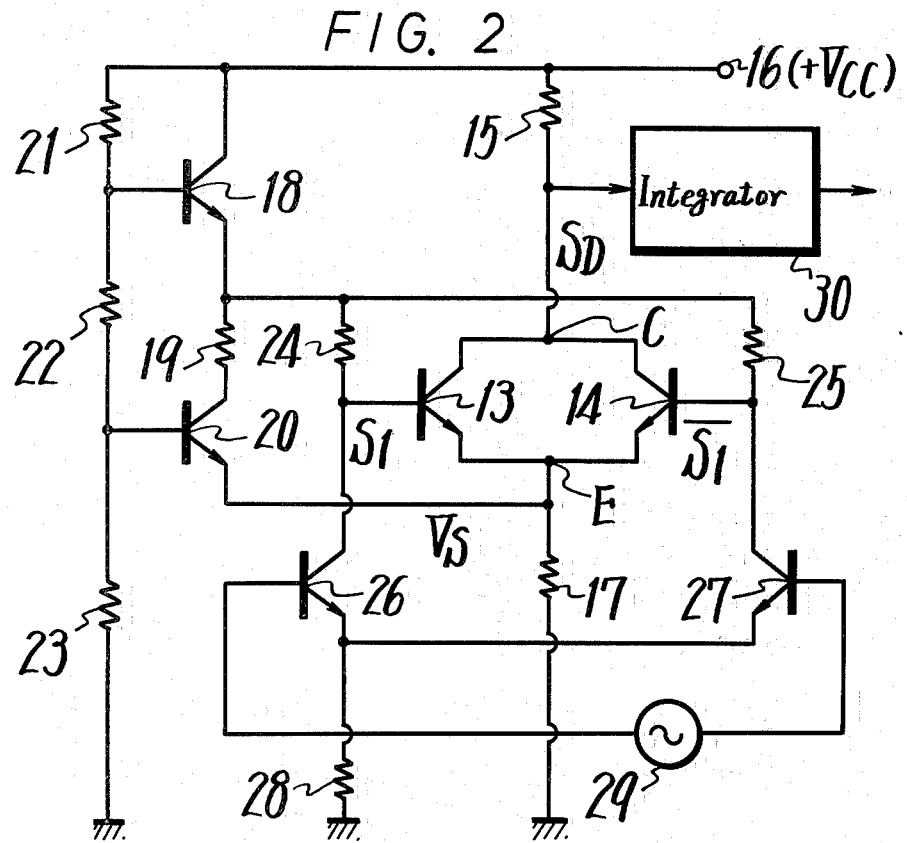
FIG. 2 is a connection diagram showing an example of the detector circuit according to the present invention.

In the example of FIG. 2, there are provided transistors 13 and 14 whose collector electrodes are connected together at a point C and whose emitter electrodes are connected together at a point E. The connection point C is connected through a resistor 15 to a voltage source terminal 16 of $+V_{cc}$, while the connection point E is grounded through a resistor 17. The voltage source terminal 16 is connected to the connection point E through the collector-emitter path of a transistor 18, a resistor 19 and the collector-emitter path of a transistor 20 and also connected to ground through a series connection of resistors 21, 22 and 23. The connection point between the resistors 21 and 22 is connected to the base electrode of the transistor 18, and the connection point between the resistors 22 and 23 is connected to the base electrode of the transistor 20. The emitter of the transistor 18 is connected to the collector electrode of a transistor 26 through a resistor 24 and to the collector electrode of a transistor 27 through a resistor 25. The collector electrodes of the transistors 26 and 27 are connected to the base electrodes of the transistors 13 and 14, respectively, and the emitter electrodes of the transistors 26 and 27 are connected together and then grounded through a resistor 28. An input signal source 29 is inserted between the base electrodes of the transistors 26 and 27. The connection point C between the collector electrodes of the transistors 13 and 14 is connected to an integrator circuit 30.

Figure 3A:
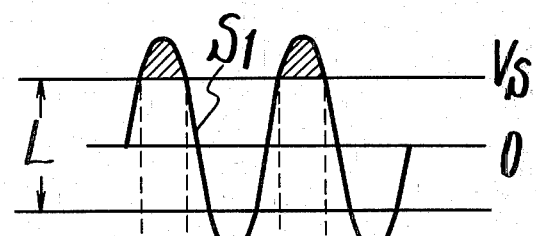
FIGS. 3A, 3B, and 3C are waveform diagrams used for explaining the operation of the detector circuit shown in FIG. 2.
Figure 3B:
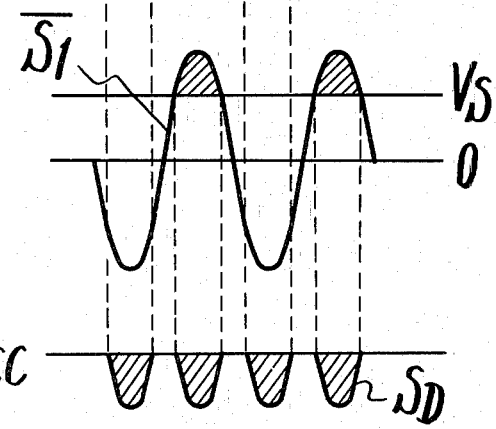
Figure 3C:
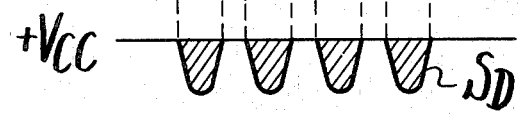

In this case, the resistance values of the resistors 21, 22 and 23 are so selected that the transistors 18 and 20 are always biased ON. Accordingly, the transistors 26 and 27 operate as a differential amplifier and a constant voltage $V_s$ is applied through the base-emitter path of the transistor 20 to the connection point E. Input signals $S_1$ and $\bar{S}_1$, which are opposite in phase as shown in FIGS. 3A and 3B, are applied to the base electrodes of the transistors 13 and 14, respectively. Thus, the transistor 13 turns ON when the input signal $S_1$ exceeds the constant voltage $V_s$ during the positive half cycle of the input signal $S_1$, and the transistor 14 turns ON when the input signal $\bar{S}_1$ exceeds the constant voltage $V_s$ in its positive half cycle. As a result, at the connection point C there is obtained a detected output signal $S_D$ which corresponds to a full-wave rectified signal of the portions of the input signal $S_1$ exceeding a constant level range L and with the point zero of the input signal $S_1$ as the center as shown in FIG. 3C. The detected output signal $S_D$ is fed to the integrator circuit 30 to be integrated.

According to the detector circuit shown in FIG. 2, if the input signal consists of a signal with a constant amplitude and a signal having a variable amplitude added thereto, similar to the output signal from the crystal filter 9 of the circuit shown in FIG. 1, only the signal component with the variable amplitude is detected, so that the sensitivity of the circuit can be enhanced.

Further, since the detector circuit of the invention uses a differential amplifier to carry out the detection and to produce a detected output of the full-wave rectification type, the efficiency is made high and waveform distortion becomes substantially lessened.

Also, the circuit of the invention shown in FIG. 2 is advantageous in that it is suitable to be formed as an integrated circuit.

In the case that the detector circuit of the invention shown in FIG. 2 is employed as the ACC detector circuit 11 used in the circuit of FIG. 1, the signal input source 29 is replaced by the output from the crystal filter 9 and the output from the integrator circuit 30 is applied to the ACC amplifier 2. In such a case, even if noise appears in the output signal from the crystal filter 9 whether due to a feeble signal or the reception of a black and white television broadcasting signal, the noise whose level is lower than the constant voltage $V_s$ does not appear at the output. In general, a noise component has a wide bandwidth and is random, so that it is attenuated in the signal path such as at the crystal filter 9 and reduced below the constant voltage $V_s$. If noise which exceeds the constant voltage $V_s$ appears, it is integrated by the integrator 30 and the integrated output signal corresponding to the noise becomes insignificant. Thus, if the integrated output signal corresponding to the noise is compared with the constant level, the color killer and ACC amplifier can be operated positively.

In the example shown in FIG. 2, the constant voltage $V_s$ is applied through the transistor 20 to the connection point E, but it is possible that the constant voltage $V_s$ is applied through a diode to the connection point E.

We claim as our invention:

1. A detector circuit for a color television receiver, comprising
    a pair of transistors each having first and second currentcarrying electrodes and a control electrode, and circuits defined by the first and second current-carrying electrodes of said transistors and being connected in parallel with each other;
    circuit means receiving an input signal for supplying a corresponding differential input signal to each of the control electrodes of said pair of transistors;
    reference voltage means supplying a reference voltage to the second current-carrying electrodes of said pair of transistors;
    a source of a supply voltage;
    an impedance element coupled between the first current-carrying electrodes of said pair of transistors and supply voltage source; and
    integrating means for integrating a detected signal from the first current-carrying electrodes of said pair of transistors and thereby providing an output signal.

2. A detector circuit according to claim 1, wherein said circuit means includes a differential amplifier having input terminals to receive an input signal and a pair of output terminals respectively coupled to the control electrodes of said pair of transistors.

3. A detector circuit according to claim 1, wherein said first current-carrying electrodes, said second current-carrying electrodes, and said control electrodes of said pair of transistors are collector electrodes, emitter electrodes, and base electrodes, respectively.

4. A color demodulating circuit for use in a color television receiver, comprising the detector circuit according to claim 1; a color demodulator; an automatic chrominance control amplifier whose gain is controlled by said output signal of the detector circuit, and supplying at an output thereof a chrominance signal; means applying said chrominance signal to said demodulator; means, including oscillator means, to provide a demodulating signal to said demodulator in response to the output of said automatic chrominance control amplifier, said oscillator means providing said input signal to said circuit means of the detector circuit.

5. A detector circuit according to claim 1, wherein said reference voltage means includes another transistor having a collector electrode, an emitter electrode, and a base electrode; an impedance connected between said second current-carrying electrodes and a reference point, means for supplying current from said source of supply voltage to the collector electrode of said other transistor, the emitter electrode of said other transistor being coupled to said second current-carrying electrodes, and means biasing the base electrode of said other transistor so that said reference voltage is obtained at the emitter thereof.

6. A detector circuit according to claim 1, wherein said first current-carrying electrodes are connected together and said second current-carrying electrodes are connected together.

* * * * *